J. H. HASELHOFF.
STRAW OR HAY LOADING APPARATUS.
APPLICATION FILED MAR. 7, 1917.
1,252,901.
Patented Jan. 8, 1918.
2 SHEETS—SHEET 1.
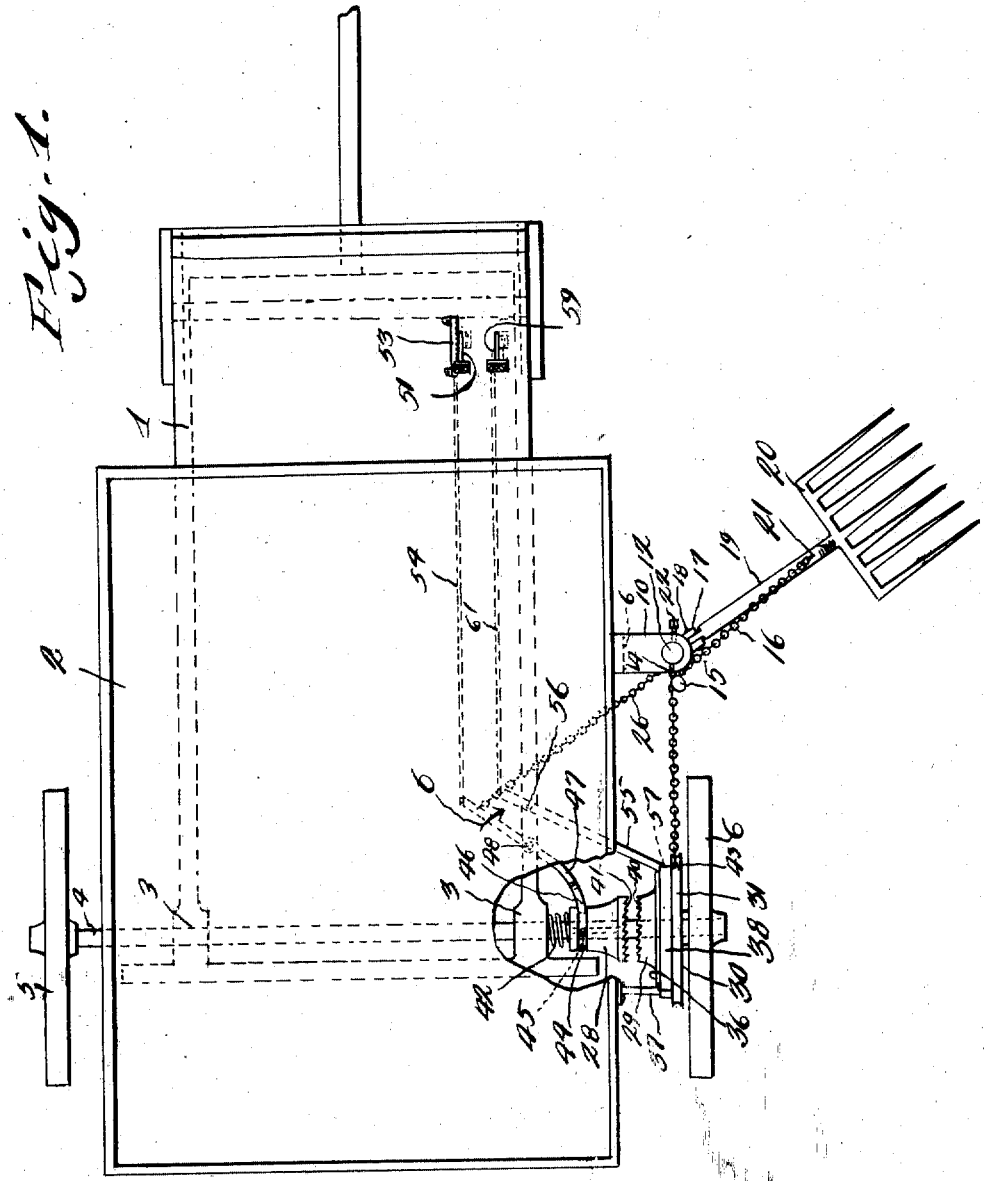
Witnesses
Inventor
J. H. Haselhoff
By D. Swift & Co.
Attorneys

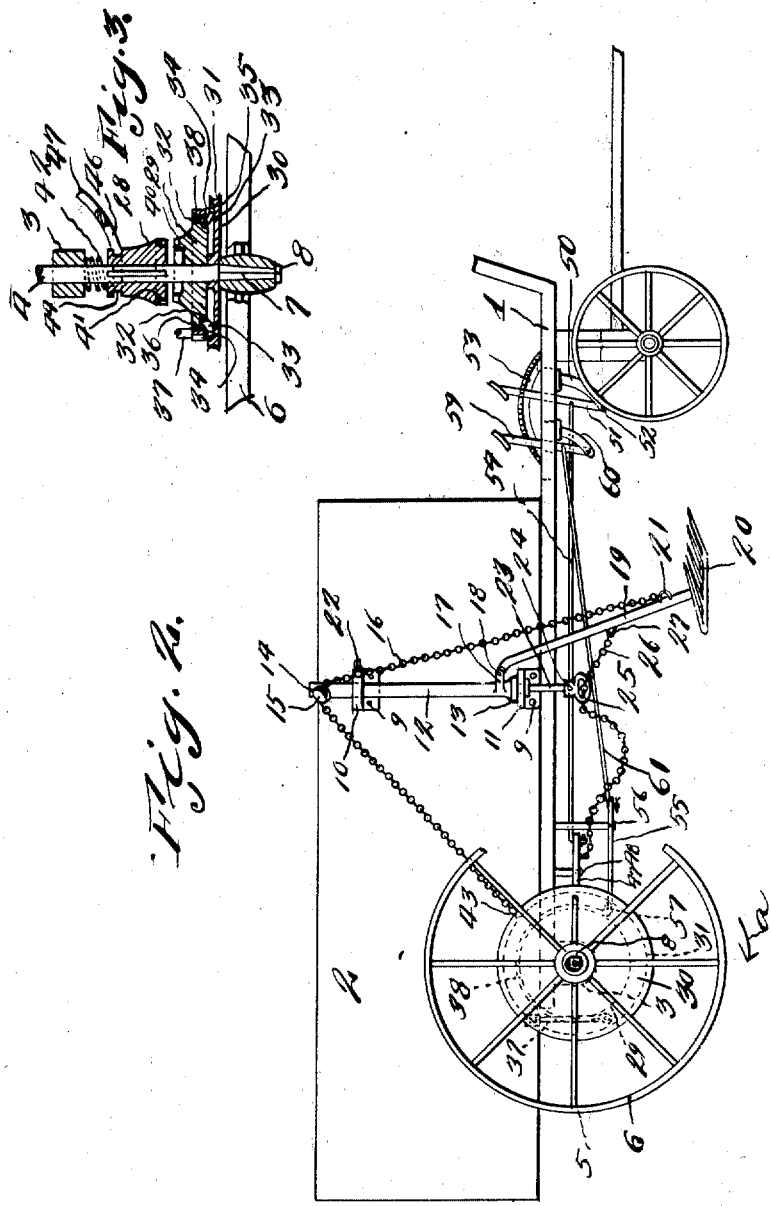

UNITED STATES PATENT OFFICE.

JOHN H. HASELHOFF, OF HIGHLAND, WISCONSIN.

STRAW OR HAY LOADING APPARATUS.

1,252,901.   Specification of Letters Patent.   Patented Jan. 8, 1918.

Application filed March 7, 1917. Serial No. 153,068.

*To all whom it may concern:*

Be it known that I, JOHN H. HASELHOFF, a citizen of the United States, residing at Highland, in the county of Iowa, State of Wisconsin, have invented a new and useful Straw or Hay Loading Apparatus; and I do hereby declare the following to be a full, clear, and exact description of the invention, such as will enable others skilled in the art to which it appertains to make and use the same.

This invention relates to an improved straw or hay loading apparatus, and one of the objects of the invention is to provide an apparatus of this particular kind that is portable by any suitable wagon or other vehicle, whereby hay or straw, loose or in bundle form, may be picked up, hoisted and loaded onto the wagon, as the same traverses the field.

A further object of the invention is the provision of a pick-up and hoisting fork having manual control clutch connections with the rear supporting axle of the vehicle, whereby the fork may be hoisted through the medium of the rotation of the axle, to hoist and load the commodity on to the wagon, after which the clutch connections may be released, allowing the fork to gravitate to its normal position.

A further object of the invention is the provision of a lifting or hoisting fork, which may be adjusted at different angles from the side of the wagon or other vehicle.

In practical fields, the details of construction may necessitate alterations, falling within the scope of what is claimed.

The invention comprises further features and combination of parts, as hereinafter set forth, shown in the drawings and claimed.

In the drawings:—

Figure 1 is a plan view of a wagon or other vehicle, showing the improved straw or hay loading apparatus as applied thereto, Fig. 2 is a view in side elevation.

Fig. 3 is a detail sectional view of the clutch mechanism carried by the rear axle of the vehicle, whereby the loading apparatus may be thrown in and out of clutch with the axle.

Referring more especially to the drawings, 1 designates the frame of a wagon or other suitable vehicle, and 2 the wagon body, and mounted in bearings 3 of the rear end of the frame, is an axle 4, on which the supporting wheels 5 and 6 are journaled. The wheel 5 rotates loosely on the spindle of the axle, while the other spindle 7 of the axle is rectangular in cross section, so that the supporting wheel 6 will rotate with the axle, there being a nut 8 to hold the wheel 6 on its spindle. Secured at 9 near the upper and lower portions of one of the sides of the body 2, are the upper and lower brackets 10 and 11, in bearings of which the vertical shaft 12 is mounted. The lower portion of the shaft 12 has an enlargement, thereby providing a shoulder 13, engaging the lower bracket 11, to prevent downward movement of the shaft 12. Suspended at 14 from the upper end of the shaft is a pulley 15 over which the upper end of the hoisting chain 16 engages. The shaft 12 has a laterally extending arm 17, in a bifurcation of which on a pin 18 the shank or arm 19 of a pick-up fork 20 is pivoted. As will be noted, the fork with its arm or shank so depends from the arm 17 as to assume a position, whereby straw or hay, loose or in bundle form may be picked up. One end of the chain 16 is connected to an eye 21 of the shank or arm 19, so that when a pulling action is imparted on the chain, in passing over said pulley 15, the fork, with its load of hay or straw, may be hoisted in such wise as to toss the hay or straw into the wagon or vehicle body. A set screw 22 is threaded through the outer portion of the bracket 10, so that its extremity may engage the shaft 12, whereby upon setting up on the set screw, the shaft 12 may be held in adjusted position. By loosening the set screw and adjusting the shaft 12, the fork may be held at different angles with respect to the body of the wagon, that is, by tightening up on the set screw. Secured to the lower extremity of the reduced part 23 of the shaft 12 by means of a pin 24 is an eye 25, through which a chain 26 extends. One end of this chain is connected to an eye 27 of the shank or member 19 of the fork. A suitable clutch mechanism is carried by the axle 4 of the vehicle, and this mechanism consists of the clutch members 28, 29 and 30. The members 29 and 30 are loose on the axle 4, and the member 30 has an annular groove 31. Pivoted upon pins 32, adjacent one face of the member 29, are the dogs 33 having frictional clutch shoes 34, which are designed to engage the inner surface of the flange 35 of the clutch member 30, whereby said members 29 and 30 may rotate substantially together, in other words, the member 30 may slip slightly with respect to the member 29, that is, when the fork is in the act of lifting a load of straw or hay. The periphery 36 of the member 29 is slightly tapered, and secured to the outer end of the pin 37 (which extends laterally and downwardly from one side of the wagon body) is a friction band 38, which engages the tapering periphery 36 of the clutch member 29.

The clutch member 29 is provided with clutch teeth 40, to be engaged by the clutch teeth 41 of the clutch member 28, that is, when the member 28 is moved toward the member 29 by the action of the spring 42, which is interposed between the member 28 and one of the bearing portions 3 of the frame. The action of the spring 42 will not only keep the teeth 40 and 41 in engagement, but will maintain the member 29 forced toward and close to the member 30, so that the dogs 33 will contact with one face of the member 30 and outwardly, so that the shoes 34 of said members 33 will frictionally contact with the flange 35 of the member 30, thereby causing the member 30 to rotate with the member 29, and when such is the case, the chain 16 (which is attached at 43 to the member 30) will wind or wrap around the groove 31 of the member 30, when the wheel 6 rotates in the direction of the arrow a, thereby imparting a pull on the chain 16 and hoisting the fork. The member 28 has an annular groove 44, into which the lugs 45 of the forks 46 of the lever 47 (which is pivoted at 48 to a part of the frame 1) extend, so that when the lever is moved in the direction of the arrow b, the teeth of the member 28 will disengage the teeth of the member 29. Projecting downwardly from the forward part of the frame 1 is a bracket arm 50, to which a foot lever 51 is pivoted as at 52. A segment rack 53 is mounted upon the upper part of the frame 1, and one edge of the foot lever is designed to coöperate with the teeth of the rack 53 to hold the lever in different adjusted positions. The rod 54 connects the lever 51 and one end of the lever 47, and by pressing the lever 51 forwardly, the lever 47 may be actuated to operate the clutch member 28 to throw its teeth out of engagement with the teeth 40 of the member 28 against the action of the spring 42, and by causing one edge of the lever 51 to engage the teeth of the segment 53, when the lever 51 is pressed forwardly, to hold the clutch member 28 out of engagement with the clutch member 29, whether the fork is lowered or in a raised position. A lever 55 is pivoted at 56 to one side of the frame 1, and one end of the lever 55 is connected at 57 to one end of the friction band 38. A second foot lever 59 is pivoted on an arm 60, which depends downwardly from the frame 1, and connecting said lever 59 and the other end of the lever 55, is a rod 61. When the clutch 28 is out of engagement with the member 29 (which is loose upon the axle 4) the fork may be held in a raised position by applying pressure on the foot lever 59, which will tighten the friction band against the tapered surface 36 of the member 29, which action will cause the friction shoes to bind against the inner surface of the flange 35, and owing to the member 30 being loose on the axle and so held by the member 29 and the shoes, the member 30 will be prevented from rotating. In the operation of picking up and loading the hay or straw, the fork is first lowered as shown in Fig. 2. The vehicle is moved forward, and the hay or straw is gathered upon the fork, and when it is supplied with a sufficient quantity, the foot lever 51 is so manipulated as to allow the spring 42 to move the clutch member 28 so that its teeth will engage the teeth of 29, in which case the chain 16 will wrap in the groove of the member 30, which will impart a pull on the chain 16, hence hoisting the fork to a sufficient point, substantially over the body 2 of the wagon, allowing the straw or hay to deposit therein. The chain 26 has sufficient looseness or slack, so that the fork may be hoisted almost to its limit, but just before the fork reaches its limit of its elevated position, the chain 26 tightens sufficiently to impart a pull on the lever 47 in the direction of the arrow b, thereby disengaging the clutch 28 from the clutch 29. At the same time pressure is applied to the foot lever 59, which will hold the fork in its raised position in the manner previously stated. When it is desired to lower the fork, (which may be accomplished gradually) pressure upon the lever 59 may be gradually lessened, which will gradually lessen the friction between the band 38 and the tapered periphery of clutch member 29.

The invention having been set forth, what is claimed as new and useful, is:—

In combination with a vehicle, a pair of upper and lower axially alined bearings mounted upon the side of the body of the vehicle, a vertical shaft mounted in said bearings and having a shoulder to engage the lower bearings to prevent downward axial movement of the shaft, a pick-up fork having its shank pivoted to the lower part of said shaft, whereby the shank may extend outwardly, downwardly and forwardly, a pulley at the upper end of the shaft, the shaft at its lower end having an eye, a chain connected to the fork and passing over the pulley, whereby the chain will pull down upon the shaft to hold said shoulder in contact with the lower bearing, when a pulling action is imparted on the chain, a second chain connected to the shank of the pick-up fork and passing through said eye, a member having clutch means mounted on the rear axle of the vehicle, and to which member the first chain is connected, spring tensioned clutch means coöperating with the first clutch means, whereby said member will rotate with the axle for raising the pick-up fork, connections between the second chain and the second clutch means, whereby as the pick-up fork reaches the limit of its raised position, said second clutch means is disengaged from the first clutch means, and foot actuated means coöperating with said member to hold it at its limit of rotation, thereby holding the pick-up fork raised.

In testimony whereof I have signed my name to this specification in the presence of two subscribing witnesses.

JOHN H. HASELHOFF.

Witnesses:
   REGINA C. DOYLE,
   FRED WEIDINFILLER.